Patented Apr. 30, 1940

2,199,352

UNITED STATES PATENT OFFICE 2,199,352

LUBRICATING OIL AND METHOD OF PREPARING THE SAME

Charles C. Towne, Beacon, N. Y., assignor to The Texas Company, New York, N. Y., a corporation of Delaware No Drawing. Application March 23, 1936, Serial No. 70,402

8 Claims. (Cl. 87—9)

This invention relates to the manufacture of an oil soluble resinous material from rubber, and to mineral lubricating oils of improved character having an increased viscosity index produced by compounding with the resinous material.

In my co-pending applications, Serial No. 738,294, filed August 3, 1934, now Patent No. 2,078,472, dated April 27, 1937, and Serial No. 24,350, filed May 31, 1935, now Patent No. 2,086,399, dated July 6, 1937, the production of a resinous polymer from rubber by reaction in the presence of halides and halogen acids of tin and boron, the purification of this resinous polymer, and the compounding of these materials with mineral lubricating oil, are described. In the production of the resinous polymer in accordance with the mentioned applications, it is found that a substantial proportion of oil insoluble polymer is also produced, which of course is unsuited for compounding with lubricating oils.

In accordance with the present invention, a resinous polymer is produced from rubber which is substantially completely oil soluble, so that the entire yield of resinous product can be employed for compounding with lubricating oils. At the same time, it is found that this improved material, when compounded with a mineral oil, possesses further advantages including increased stability when heated, better color stability, less viscosity change and greater freedom from sludge separation. The proportion of reagents required is also reduced, thereby effecting a further economical advantage. The material of the present invention is eminently suited for compounding with motor oils to produce a lubricating oil of improved character having a high viscosity index.

In accordance with the present invention, rubber in dispersion in a suitable aromatic solvent, such as benzol, is treated with a depolymerizing agent. This is accomplished by allowing the rubber dispersion to stand for a period of time, generally about 24 hours, in the presence of such a depolymerizing agent. Examples of suitable depolymerizing agents for this purpose are glacial acetic acid, hydrochloric acid, chlor-acetic acid, sulfur dioxide, hydrogen sulfide, benzoic acid, mercurous chloride and ammonia. The result of this treatment is to modify the rubber, giving a product of lower molecular weight and consequently termed depolymerized.

The dispersion of depolymerized rubber is then treated with one of a group of compounds consisting of halides and halogen acids of tin and boron, such as stannic chloride or bromide, boron trichloride, boron fluoride, fluorboric acid, chlorostannic acid, chloro-stannous acid and the corresponding brom acids. Anhydrous stannic chloride is preferred for this purpose. The reaction takes place by standing at room temperature for a period of time, such as about 24 hours. The resulting resinous polymer is then precipitated by admixing with a suitable precipitating solvent, such as an alcohol or a ketone. For example, very satisfactory results are secured with 95% ethyl alcohol, acetone containing about 5% water, and methyl alcohol containing about 5% water. The precipitate is then filtered, washed free of acid with additional precipitating solvent, and dried.

The resulting product is a white resinous polymer, which is very light in weight and powdery in appearance. It is substantially completely soluble in a mineral lubricating oil in proportions up to about 40% by weight. It possesses unusual viscosity index increasing properties, so that the addition of about 2%–3% of the polymer to a mineral lubricating oil serves to increase the viscosity index thereof very materially. The resulting lubricating oil solution may be slightly cloudy, but this is cleared by clay contacting at elevated temperatures, producing a pale, clear, bright oil.

As a specific example of the invention 50 g. of crepe rubber is dispersed in 1500 cc. of benzol (90%) containing 15 cc. of glacial acetic acid. The dispersion is allowed to stand 24 hours, and the air is then swept out with a nitrogen stream. To this depolymerized rubber dispersion, there is added 10 cc. of anhydrous fuming stannic chloride. The mixture is allowed to stand 24 hours at room temperature. The product is then run into 3500 cc. of 95% ethyl alcohol, which effects precipitation of the resinous polymer. The precipitation is completed by stirring for 2–3 hours. The precipitated polymer is then filtered off, washed free of acid with alcohol, and dried. A yield of 96% by weight of resinous polymer on the weight of the rubber used was obtained in the above example. The entire yield of resinous polymer was soluble in a lubricating oil.

It is found that the proportion of depolymerizing agent employed has an effect upon the yield of the soluble polymer. For example, where no glacial acetic acid is employed, about 50% of the resulting precipitate is insoluble in lubricating oil. Where 5 cc. of acetic acid is employed with the above mentioned proportions, a substantial quantity of insoluble polymer is still produced, although the yield of precipitate is substantially 100% on the weight of the rubber used. Where larger quantities of glacial acetic acid than 15 cc. for the above mentioned proportions of other ingredients are employed, the entire precipitate is oil soluble but there is no apparent advantage in the use of the larger proportions. Consequently, for most economical production of oil soluble polymer, it is desirable to predetermine the proportion of depolymerizing agent employed so as to render the entire precipitate substantially completely oil soluble and still give an optimum yield of the soluble polymer.

Not only is an optimum yield of oil soluble polymer obtained in accordance with the present invention, but this polymer when compounded with mineral lubricating oil possesses superior properties. The material is highly effective in improving the viscosity index of the oil, and the compounded oil possesses increased stability when heated, as is reflected in better color, less viscosity change and greater freedom from sludge separation.

The following is an example of a compounded oil prepared by the addition of 3% by weight of the resinous polymer to furfural refined Mid-Continent lubricating distillate consisting of 58.2% by weight of an S. A. E. #10 oil and 38.8% by weight of an S. A. E. #20 oil. The properties of the base oils as well as the compounded oil are as follows:

|  | S. A. E. #10 | S. A. E. #20 | Compounded oil |
|---|---|---|---|
| Gravity, A. P. I. | 31.0 | 27.0 | |
| Flash, °F | 395 | 445 | |
| Fire, °F | 450 | 495 | |
| Viscosity SU/100° F | 172 | 351 | 433 |
| Viscosity SU/210° F | 44.6 | 53.3 | 63.2 |
| Viscosity index—Dean & Davis | 97 | 82 | 112 |
| Carbon residue, percent | .02 | .05 | .06 |
| Neutralization No | | | .03 |

As indicative of the superior stability of the resinous polymer prepared in accordance with the present invention, in comparison to that obtained by direct treatment of rubber with stannic chloride without first depolymerizing the same, the following data obtained by heating the base oil and the compounded oils for three days at a temperature of 150° C. in an air atmosphere, is given:

|  | Base oils | | Base oils compounded with polymer obtained without preliminary depolymerization | | Base oils containing polymer prepared by preliminary depolymerization | |
|---|---|---|---|---|---|---|
|  | Before heating | After heating | Before heating | After heating | Before heating | After heating |
| Vis. SU/100° F | 222 | 225 | 392 | 361 | 383 | 371 |
| Vis. change | | +3 | | −31 | | −12 |

Obviously many modifications and variations of the invention, as hereinbefore set forth, may be made without departing from the spirit and scope thereof, and therefore only such limitations should be imposed as are indicated in the appended claims.

I claim:

1. The method in the manufacture of a lubricating oil of improved character, which comprises depolymerizing a dispersion of rubber in an aromatic solvent with a depolymerizing agent, reacting the depolymerized rubber in the presence of one of a group of compounds consisting of halides and halogen acids of tin and boron to produce a resinous polymer, precipitating and separating the resinous polymer, and dissolving the polymer in a minor proportion in a petroleum lubricating oil.

2. The method in the manufacture of a lubricating oil of improved character, which comprises depolymerizing a dispersion of rubber in an aromatic solvent with a depolymerizing agent, reacting the depolymerized rubber in the presence of one of a group of compounds consisting of halides and halogen acids of tin and boron to produce a resinous polymer, precipitating and separating the resinous polymer, dissolving the polymer in a minor proportion in a petroleum lubricating oil, and clay contacting the lubricating oil solution of resinous polymer.

3. The method in the manufacture of a lubricating oil of improved character, which comprises depolymerizing a dispersion of rubber in an aromatic solvent in the presence of a depolymerizing agent selected from the group consisting of glacial acetic acid, hydrochloric acid, chlor-acetic acid, acidified benzene, sulfur dioxide, hydrogen sulfide, and benzoic acid, then reacting the depolymerized rubber in the presence of anhydrous stannic chloride to produce a resinous polymer, precipitating and separating the resinous polymer from the reaction mixture, and dissolving the separated resinous polymer in a minor proportion in a petroleum lubricating oil.

4. An improved lubricating oil comprising a petroleum lubricating oil containing dissolved therein to a clear solution a minor proportion of a resinous polymer which is the reaction product of depolymerized rubber with one of a group of compounds consisting of halides and halogen acids of tin and boron.

5. An improved lubricating oil comprising a petroleum lubricating oil containing dissolved therein to a clear solution a minor proportion of a resinous polymer which is the reaction product with anhydrous stannic chloride of rubber depolymerized by the action of a depolymerizing agent selected from the group consisting of glacial acetic acid, hydrochloric acid, chlor-acetic acid, acidified benzene, sulfur dioxide, hydrogen sulfide, and benzoic acid.

6. An improved lubricating oil comprising a petroleum lubricating oil containing dissolved therein to a clear solution a minor proportion of a resinous polymer which is the reaction product with anhydrous stannic chloride of rubber depolymerized in dispersion in an aromatic solvent in the presence of glacial acetic acid.

7. The method in the manufacture of a lubricating oil of improved character, which comprises dispersing rubber in an aromatic solvent in the presence of a depolymerizing agent and reacting with one of a group of compounds consisting of halides and halogen acids of tin and boron to produce a substantially completely oil-soluble resinous polymer from the rubber, precipitating and separating the resinous polymer, and dissolving the polymer in a minor proportion in a petroleum lubricating oil.

8. The method in the manufacture of a lubricating oil of improved character, which comprises dispersing rubber in an aromatic solvent in the presence of glacial acetic acid and reacting the same with stannic chloride to produce a substantially completely oil-soluble resinous polymer from the rubber, precipitating and separating the resinous polymer, and dissolving the polymer in a minor proportion in a petroleum lubricating oil.

CHARLES C. TOWNE.